(12) United States Patent
Sugimori

(10) Patent No.: US 6,958,772 B1
(45) Date of Patent: Oct. 25, 2005

(54) IMAGE SENSING APPARATUS AND IMAGE PROCESSING METHOD THEREFOR

(75) Inventor: Masami Sugimori, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/484,989

(22) Filed: Jan. 18, 2000

(30) Foreign Application Priority Data

| Jan. 20, 1999 | (JP) | ................................. 11-012338 |
| Jan. 20, 1999 | (JP) | ................................. 11-012339 |
| Mar. 1, 1999 | (JP) | ................................. 11-053383 |
| Mar. 1, 1999 | (JP) | ................................. 11-053384 |

(51) Int. Cl.$^7$ .......................... H04N 5/228; G03F 3/08; G06K 9/00
(52) U.S. Cl. ................... 348/222.1; 358/518; 382/162
(58) Field of Search ................. 348/222.1, 225.1, 348/241; 382/162, 254, 274, 300; 358/518–519

(56) References Cited

U.S. PATENT DOCUMENTS

| 4,663,655 A |  | 5/1987 | Freeman ..................... 358/41 |
| 4,724,395 A |  | 2/1988 | Freeman ..................... 328/151 |
| 4,774,565 A | * | 9/1988 | Freeman ..................... 348/242 |
| 5,373,322 A |  | 12/1994 | Laroche et al. ............. 348/273 |
| 5,463,419 A | * | 10/1995 | Saito ........................ 348/231.9 |
| 5,552,825 A |  | 9/1996 | Talluri et al. |
| 5,629,734 A |  | 5/1997 | Hamilton, Jr. et al. ...... 348/222 |
| 6,456,325 B1 | * | 9/2002 | Hayashi ..................... 348/234 |
| 6,697,110 B1 | * | 2/2004 | Jaspers et al. ............. 348/223.1 |
| 2002/0061063 A1 | * | 5/2002 | Otto ........................ 375/240.03 |

FOREIGN PATENT DOCUMENTS

| EP | 0304643 | 3/1989 |
| EP | 0416876 | 3/1991 |
| EP | 0920221 | 6/1999 |
| JP | 62-034484 | 2/1987 |
| JP | 2-254865 | 10/1990 |
| JP | 4-172094 | 6/1992 |
| JP | 5-505084 | 6/1992 |
| JP | 05-012437 | 1/1993 |
| JP | 05-233804 | 9/1993 |
| JP | 06-006822 | 1/1994 |

(Continued)

*Primary Examiner*—Aung Moe
*Assistant Examiner*—Kelly L. Jerabek
(74) *Attorney, Agent, or Firm*—Morgan & Finnegan, L.L.P.

(57) ABSTRACT

An image sensing apparatus comprising: a CCD, optical system for forming an image on the CCD; A/D converter for converting an image signal outputted by the CCD to a digital signal; color interpolator for performing color interpolation on the digital signal converted by the A/D converter and generating image data on R, G and B color planes; color space converter for converting RGB color space to YUV colorimetric system; and median filter for reducing pseudo color components, generated by the color interpolator, by controlling color difference signals U and V. By cutting high frequency components of the signal, filtered by the median filter, then thinning out YUV signals and performing JPEG compression, pseudo color components generated by color interpolation can be reduced.

15 Claims, 21 Drawing Sheets

FOREIGN PATENT DOCUMENTS

| | | |
|---|---|---|
| JP | 8-009394 | 1/1996 |
| JP | 9-130815 | 5/1997 |
| JP | 10-164371 | 6/1998 |
| JP | 10-200906 | 7/1998 |
| JP | 10243409 | 9/1998 |
| JP | 10-341447 | 12/1998 |
| JP | 11196429 | 7/1999 |
| JP | 2000023085 | 1/2000 |
| JP | 2000184383 | 6/2000 |
| JP | 2000-217123 | 8/2000 |
| WO | WO 92/10911 | 6/1992 |
| WO | WO 97/34423 | 9/1997 |

* cited by examiner

| a*11<br>8 | a*12<br>10 | a*13<br>12 |
|---|---|---|
| a*21<br>10 | a*22<br>20 | a*23<br>11 |
| a*31<br>9 | a*32<br>11 | a*33<br>10 | a*22=20

↓ REPLACE a*22=10 (MEDIAN VALUE)

BAYER PATTERN

COLOR INTERPOLATION

HIGH PASS FILTER

ABSOLUTE VALUE OF HPF OUTPUT

| G11 | R12 | G13 | R14 | G15 |
|-----|-----|-----|-----|-----|
| B21 | G22 | B23 | G24 | B25 |
| G31 | R32 | G33 | R34 | G35 |
| B41 | G42 | B43 | G44 | B45 |
| G51 | R52 | G53 | R54 | G55 |

= 0

R33 = (R32 + R34) /2  
G33 = 0  
B33 = (B23 + B43) /2 = 0  ⇒ Red

R43 = (R32 + R34 + R52 + R54) /4  
G43 = (G33 + G53) /2 = 0  ⇒ Red  
B43 = 0

R34 = R34  
G34 = (G24 + G33 + G35 + G44) /4  ⇒ Yellow  
B34 = (B22 + B25 + B43 + B44) /4 = 0

R44 = (R34 + R54) /2  
G44 = G44  ⇒ Yellow  
B44 = (B43 + B44) /2 = 0

FIG. 20

| G11 | R12 | G13 | R14 | G15 |
|---|---|---|---|---|
| B21 | G22 | B23 | G24 | B25 |
| G31 | R32 | G33 | R34 | G35 |
| B41 | G42 | B43 | G44 | B45 |
| G51 | R52 | G53 | R54 | G55 |

▨ = 0

R33 = (R32 + R34) /2 = 0
G33 = G33
B33 = (B23 + B43) /2  ⇒ Cyan

R43 = (R32 + R34 + R52 + R54) /4 = 0
G43 = (G33 + G53) /2
B43 = B43  ⇒ Cyan

R34 = 0
G34 = (G24 + G44) /2 = 0
B34 = (B23 + B25 + B43 + B45) /4  ⇒ Blue

R44 = (R34 + R54) /2 = 0
G44 = 0
B44 = (B43 + B45) /2  ⇒ Blue

R33 = (R32 + R34) /2 = 0
G33 = 0
B33 = (B23 + B43) /2     ⇒ Magenta

R43 = (R32 + R34 + R52 + R54) /4
G43 = (G33 + G43 + G44 + G53) = 0     ⇒ Magenta
B43 = B43

R34 = R34
G34 = (G24 + G33 + G35 + G44) /4 = 0     ⇒ Magenta
B34 = (B23 + B25 + B43 + B44) /4

R44 = (R34 + R54)
G44 = G44     ⇒ Magenta
B44 = (B43 + B44) /2

▨ = 0

IMAGE SENSING APPARATUS AND IMAGE PROCESSING METHOD THEREFOR

BACKGROUND OF THE INVENTION

The present invention relates to an image sensing apparatus such as a digital camera or digital video camera or the like, and an image processing method for the image sensing apparatus.

A conventional single-plate color digital camera is a lens-integrated system, and is generally incapable of exchanging a lens. For this reason, an optical low pass filter and infrared ray (IR) filter or the like are provided before a CCD, which generates image signals according to light passing through the lens, thereby achieving a certain degree of effectiveness in reducing moiré or pseudo colors (erroneous colors). However, in a case of a camera which allows lens exchange, an IR filter can be provided before a CCD by forming a thin film on a glass surface of the CCD. However, securing space for an optical low pass filter before a CCD causes to increase the size of the camera body. Furthermore, although such optical low pass filter can reduce moiré or pseudo colors to a certain degree, a problem arises in that spatial frequency of an image decreases, and as a result, the image loses exact-focused characteristic such as that obtained in silver chloride photographs. Because of the above reason, the importance of an optical system without an optical low pass filter is increasing.

Furthermore, even if such optical low pass filter is provided, in a case of a digital camera employing a single-plate CCD, pseudo colors are still generated when color interpolation is performed. As exemplified by the Bayer pattern, when a number of R (red) and B (blue) color components is less than that of G (green) color components, the gap between these pixels becomes large, and this causes generation of pseudo colors in color interpolation. Furthermore, a method of generating three color planes with a digital filter or the like is available as a conventional color interpolation. However, since the order of the digital filter is limited, original image data resolution cannot be sufficiently expressed.

In view of the above, conventionally proposed is to perform image processing, particularly color interpolation, disclosed in U.S. Pat. No. 5,373,322 or No. 5,629,734, to obtain high resolution image data. This technique is effective to reduce pseudo colors, but not effective for moiré.

Even with the conventional technique, isolated pseudo colors, generated particularly around small characters or the like, cannot completely be eliminated. In view of this, it is proposed to convert color space, e.g., from RGB to L*a*b*, by an application program operating in a computer, and perform processing such as filtering on a* and b* to remove pseudo colors.

However, even if such conventional technique is employed, pseudo colors in color interpolation cannot completely be eliminated. This is further described below.

As shown in FIG. 19, if vertical white lines are exposed to green (G) and red (R) lines of a CCD at pixel pitch and conventional color interpolation is performed, red (R) and yellow (Y) vertical stripes are obtained (in FIG. 19, hatching portion indicates black where data is 0). Similarly, as shown in FIG. 20, if vertical white lines are exposed to green (G) and blue (B) lines of a CCD at pixel pitch and color interpolation is performed, blue (B) and cyan (C) vertical stripes are obtained. Note that even if the stripes in FIGS. 19 and 20 are horizontal instead of vertical, the same results, i.e., red (R) and yellow (Y) stripes or blue (B) and cyan (C) stripes, are obtained.

Furthermore, as another pattern, if white pixels having a checker flag pattern shown in FIG. 21 are exposed to R and B of a CCD and color interpolation is performed, a magenta (M) image is obtained despite the original white color. Still further, if white pixels having a checker flag pattern shown in FIG. 22 are exposed to G of the CCD and color interpolation is performed, a green (G) image is obtained despite the original white color.

In order to remove such pseudo colors, the color space is converted from RGB to, for instance, L*a*b* and filtering is performed on each of the a* and b* color spaces by an application program operating in a personal computer. However, in the case of checker flag patterns shown in FIGS. 21 and 22, a low frequency image of green cannot be distinguished from that of magenta, making it impossible to determine pseudo colors. If the frequency band of color difference is forcefully limited for JPEG compression, a dull (blurred) image is obtained. As a result, although the level of pseudo colors is reduced, the pseudo color components are spread out to the peripheral pixels, causing problems.

Furthermore, if the image data is compressed according to JPEG or the like without performing above-described pseudo color removing processing, block noise or the like may be caused. Moreover, if the frequency band of color difference is forcefully limited for JPEG compression, an image becomes blurred. As a result, although the level of pseudo colors is reduced, the pseudo color components are spread out to the peripheral pixels, causing problems. In order to eliminate such pseudo colors, it is ideal to employ a three-plate camera using three image sensing devices for each color component. However, such construction increases the size and cost of the camera.

SUMMARY OF THE INVENTION

The present invention is made in consideration of the above situation, and has as its object to provide an image sensing apparatus capable of reducing pseudo colors generated by color interpolation, and an image processing method for the image sensing apparatus.

Furthermore, another object of the present invention is to provide an image sensing apparatus which can reduce pseudo colors without increasing the size or cost of the image sensing apparatus, and an image processing method for the image sensing apparatus.

Furthermore, another object of the present invention is to provide an image sensing apparatus which can reduce pseudo colors with relatively a simple construction, and an image processing method for the image sensing apparatus.

Furthermore, Another object of the present invention is to provide an image sensing apparatus which can reduce pseudo colors in isolated pixels with relatively a simple construction, and an image processing method for the image sensing apparatus.

In order to attain the above-described objects, the image sensing apparatus according to the present invention has the following configuration.

More specifically, the present invention provides an image sensing apparatus comprising: an image sensing device; image forming means for forming an image on said image sensing device; A/D conversion means for converting an image signal outputted by said image sensing device into a digital signal; color interpolation means for performing color interpolation on the digital signal converted by said A/D conversion means and generating image data on a plurality of color planes; color space conversion means for converting a color space of the plurality of color planes to a color space of another calorimetric system; and isolated point removing means for reducing a pseudo color, generated by said color interpolation means, by controlling a color difference signal converted by said color space conversion means.

Furthermore, the present invention provides an image sensing apparatus comprising: an image sensing device; image forming means for forming an image on said image sensing device; A/D conversion means for converting an image signal outputted by said image sensing device into a digital signal; color interpolation means for performing color interpolation on the digital signal converted by said A/D conversion means and generating image data on a plurality of color planes; pseudo color removing means for reducing a pseudo color component included in image data, on which color interpolation is performed by said color interpolation means; color space conversion means for converting a color space of the plurality of color planes, where a pseudo color is reduced by said pseudo color removing means, to a color space of another colorimetric system; and compression means for compressing image data where color space is converted by said color space conversion means.

Herein, the isolated point removing means includes an isolated point removing filter which replaces a value of a pixel of interest with a substantial median pixel value of peripheral pixels of the pixel of interest. Also, the isolated point removing filter includes a median value filter or median filter.

Moreover, the color interpolation means generates image data in R, G and B planes.

Further, the color space conversion means may convert RGB color space to YUV color space.

Still further, the color space conversion means may convert RGB color space to Y, R-Y, B-Y color space.

Still further, the color space conversion means may convert RGB color space to G, R-G, B-G color space.

Moreover, the image forming means includes an infrared ray filter, or an infrared ray filter and optical low pass filter.

Furthermore, the image processing method for the image sensing apparatus according to the present invention has the following steps.

More specifically, the present invention provides an image processing method for an image sensing apparatus which includes an image sensing device and generates an image signal corresponding to an image formed on the image sensing device, comprising: an A/D conversion step of converting an image signal outputted by the image sensing device into a digital signal; a color interpolation step of performing color interpolation on the digital signal converted in said A/D conversion step and generating image data on a plurality of color planes; a separation step of separating the image data in the plurality of color planes into luminance data and color difference data; an extraction step of extracting a high frequency component from the luminance data separated in said separation step; and a pseudo color removing step of reducing a pseudo color generated in said color interpolation step, in accordance with the high frequency component of the luminance data extracted in said extraction step and hue data obtained from the color difference data.

Herein, the pseudo color removing step comprises: a determination step of determining whether or not the high frequency component of the luminance data and the hue data fall within a color range of the pseudo color; and a step of reducing a value of the color difference data, determined to be within the color range in said determination step.

Moreover, in the color space conversion step, it is preferable that the color space be converted to YUV, or Y, R-Y, B-Y, or G, R-G, B-G color space.

Moreover, the image processing method may further comprise a step of removing a high frequency component from a color signal, from which the pseudo color is removed in said pseudo color removing step.

Herein, the color range of the pseudo color includes a color area from red to yellow, and a color area from blue to cyan.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 20 is a conceptual view explaining a general pseudo color generation process;

DETAILED DESCRIPTION OF THE PREFERRED EMBODIMENTS

Preferred embodiments of the present invention will be described in detail in accordance with the accompanying drawings.

First Embodiment

Figure 1:
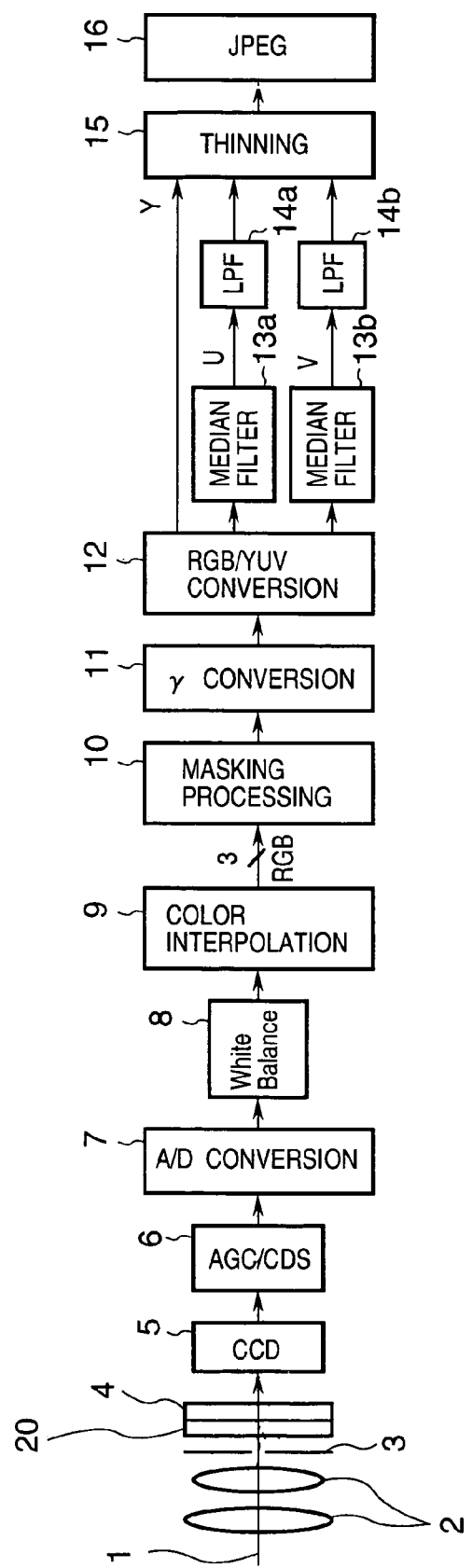
FIG. 1 is a block diagram showing, mainly, a construction of an image processing unit of a digital camera according to the first embodiment of the present invention.

FIG. 1 is a block diagram showing, mainly, a construction of an image processing unit of a digital camera according to a first embodiment of the present invention.

Light 1, incident upon the digital camera according to the first embodiment, passes through lens 2, then the amount of the light is adjusted by a diaphragm 3, and an image sensing device 5 (hereinafter referred to as a CCD), e.g., CCD or CMOS, is exposed while a shutter (not shown) is open. Before the light 1 is incident upon the CCD 5, an optical low pass filter 20 limits a spatial frequency of the light 1 to reduce moiré in a way that an optical area of a long wavelength is cut off by an infrared ray (IR) filter 4 so that the CCD 5 does not detect light in the infrared region. By the light incident upon the CCD 5, the amount of electric charge corresponding to the intensity of light is accumulated in the CCD 5. The amount of electric charge is amplified by a predetermined gain by a CDS-AGC 6, and converted to digital data by an A/D converter 7. Image data converted to digital data in the foregoing manner is transferred to a white balance circuit 8 where R, G and B gains are adjusted. Then, by a color interpolator 9, the image data is generated in, for instance, three color (R, G and B) planes. The image data expressed in the R, G and B planes are then transferred to a masking processor 10 where adjustment is made for the hue of the R, G and B colors. Then, a gamma converter 11 performs necessary processing for displaying an image on a display or the like.

Next, compression according to JPEG or the like is performed on the image data since the data in the R, G and B color planes has a large amount of data.

Herein, first, an RGB/YUV converter 12 converts the image data from R, G and B signals to Y color difference signals. For instance, R, G and B data are respectively converted to Y, U and V as follows:

$$Y = 0.29900 \times R + 0.58700 \times G + 0.11400 \times B \quad (1)$$

$$U = -0.16874 \times R - 0.33126 \times G + 0.50000 \times B \quad (2)$$

$$V = 0.50000 \times R - 0.41869 \times G - 0.08131 \times B \quad (3)$$

Next, with respect to U and V, each representing a color difference signal, a pseudo color generated by color interpolation is reduced by median filters 13a and 13b. Low pass filters (LPF) 14a and 14b remove high frequency components to limit the band. Then, a thinning circuit 15 performs thinning processing which complies with a predetermined compression method, e.g., from Y:U:V=4:4:4 to Y:U:V=4:2:2 or Y:U:V=4:1:1. Then, a compression circuit 16 adopting JPEG or the like performs compression.

Figures 2A, 2B:
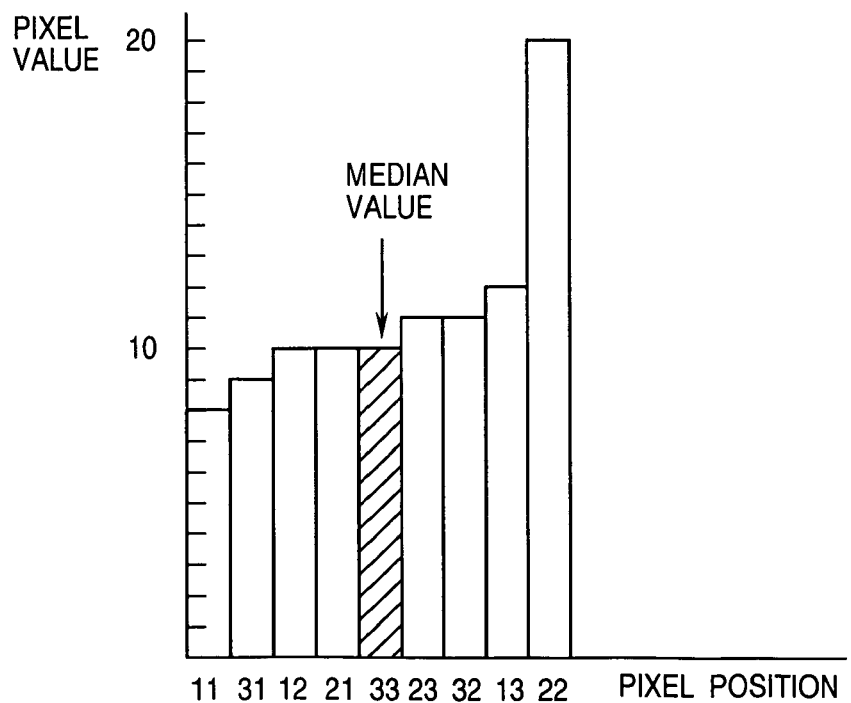
FIGS. 2A and 2B are conceptual views explaining pseudo color removal according to embodiments of the present invention.

FIGS. 2A and 2B explain the principle of processing performed by the median filters 13a and 13b according to the first (and subsequent) embodiment. Herein, FIG. 2A shows 3×3 pixels peripheral to a pixel of interest, and FIG. 2B shows a graph of pixel values arranged in the ascending order.

Herein, for instance, 3×3 pixels peripheral to a pixel of interest a*22 are extracted, and the pixel values (color difference values) are arranged in the ascending order. Then, the value "20" of the pixel of interest is replaced with the value "10" of a*33, which is the substantial median value of the nine pixels. Such processing is performed by the median filters 13a and 13b, serving as isolated point removing filters. By this, isolated pseudo colors can be reduced without largely decreasing resolution. Note that since the configuration of the median filter is well known (e.g., disclosed in Japanese Patent Application Laid-Open No. 5-233804 or No. 5-12437), detailed description thereof will be omitted.

As has been described above, according to the first embodiment, a color space of an inputted image signal is converted from RGB to YUV color space, and an isolated pixel is removed from color difference signals U and V of the YUV signal by the median filter or the like. By virtue of this, pseudo colors generated by color interpolation can be reduced.

Second Embodiment

In the above-described first embodiment, color conversion from RGB to YUV color space is performed and pseudo color reduction processing is performed in the YUV color space before image compression is performed according to JPEG or the like. However, pseudo color reduction processing is not necessarily performed in YUV color space, but may be performed in another color space.

According to the second embodiment of the present invention, pseudo color removal is performed by a median filter, after a color space of input image data is converted from RGB color space to Y, R-Y, B-Y color space.

Figure 3:
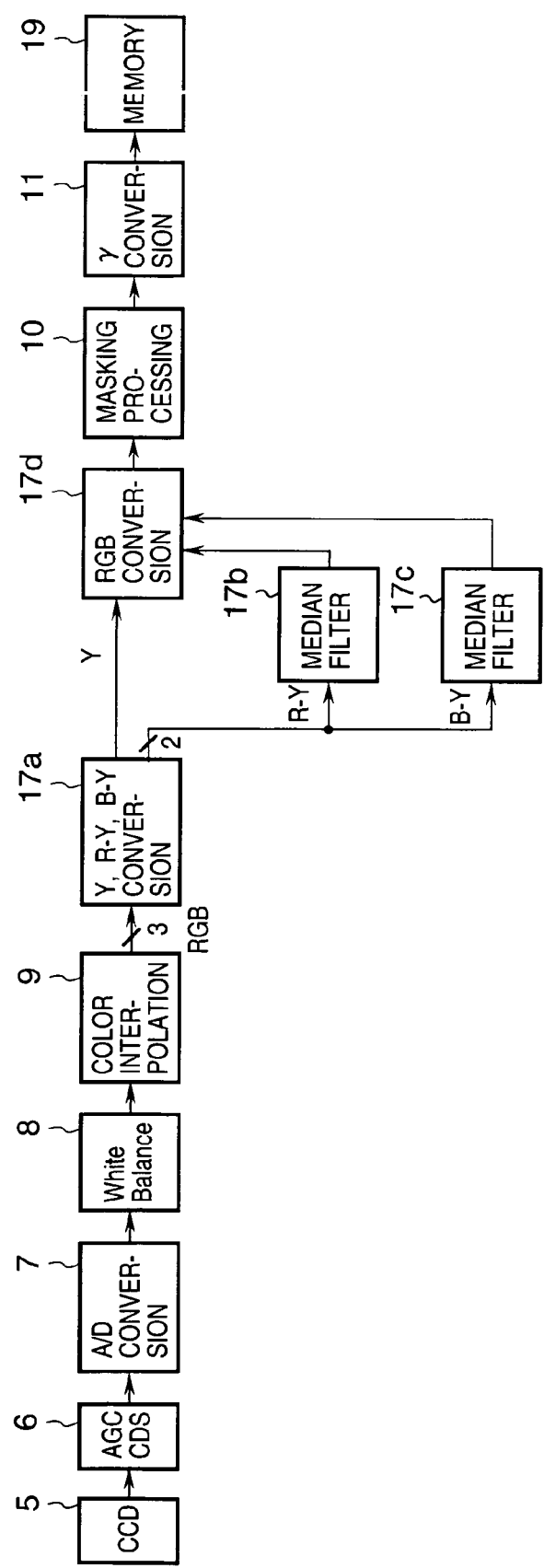
FIG. 3 is a block diagram showing, mainly, a construction of an image processing unit of a digital camera according to the second embodiment of the present invention.

FIG. 3 is a block diagram showing a construction of an image processing unit of a digital camera according to the second embodiment. For the components that are common to the construction shown in FIG. 1, the same reference numerals are assigned and description thereof will be omitted. The second embodiment largely differs from the foregoing first embodiment in that the second embodiment does not necessitate JPEG compression and that the YUV conversion can be eliminated since the pseudo-color-removed image data is stored in a memory 19. Therefore, the construction of the image processing unit can be made simple, which contributes to the effect of the second embodiment.

This is also applicable to a case of performing compression according to JPEG or the like.

According to the second embodiment, in order to achieve reduction in the amount of calculation compared to the case of converting data from RGB to YUV color space, image data is converted from RGB color space to Y, R-Y, B-Y color space by, for instance, using a Y, R-Y, B-Y converter 17a.

Herein, for instance, color space conversion is executed in the following manner:

$$Y = 0.29900 \times R + 0.58700 \times G + 0.11400 \times B \quad (4)$$

$$R-Y = R-Y \quad (5)$$

$$B-Y = B-Y \quad (6)$$

Then, the median filters 17b and 17c respectively executes median filtering of the R-Y signal and B-Y signal. Herein, the equation can be further simplified as follows to obtain luminance signal Y, color difference signals R-Y and B-Y:

$$Y = R + 2 \times G + B = Ye \quad (7)$$

$$R-Y = R-Ye \quad (8)$$

$$B-Y = B-Ye \quad (9)$$

In this case, R-Ye and B-Ye are calculated with a luminance signal Ye which is a simplified (approximate) form of the luminance signal Y. By executing median filtering respectively to R-Ye and B-Ye, pseudo colors can be removed. Although the resultant values are slightly different from values of Y, R-Y and B-Y, a similar effect is achieved and calculation can be performed easily. Next, an RGB converter 17d respectively converts the Y, R-Y and B-Y signals back to R, G and B signals. The image data represented by R. G and B signals is subjected to masking by a masking processor 10 and to a gamma conversion by a gamma converter 11, and then stored in the non-volatile memory 19.

Third Embodiment

In the above-described second embodiment, the luminance signal Y is consciously calculated from R, G and B signals. However, in image processing, G signal of the R, G and B may substitute for the luminance signal Y.

The third embodiment is characterized by employing G, R-G and B-G signals instead of Y, R-Y and B-Y signals employed in the second embodiment, and executing median filtering to R-G and B-G signals respectively.

Figure 4:
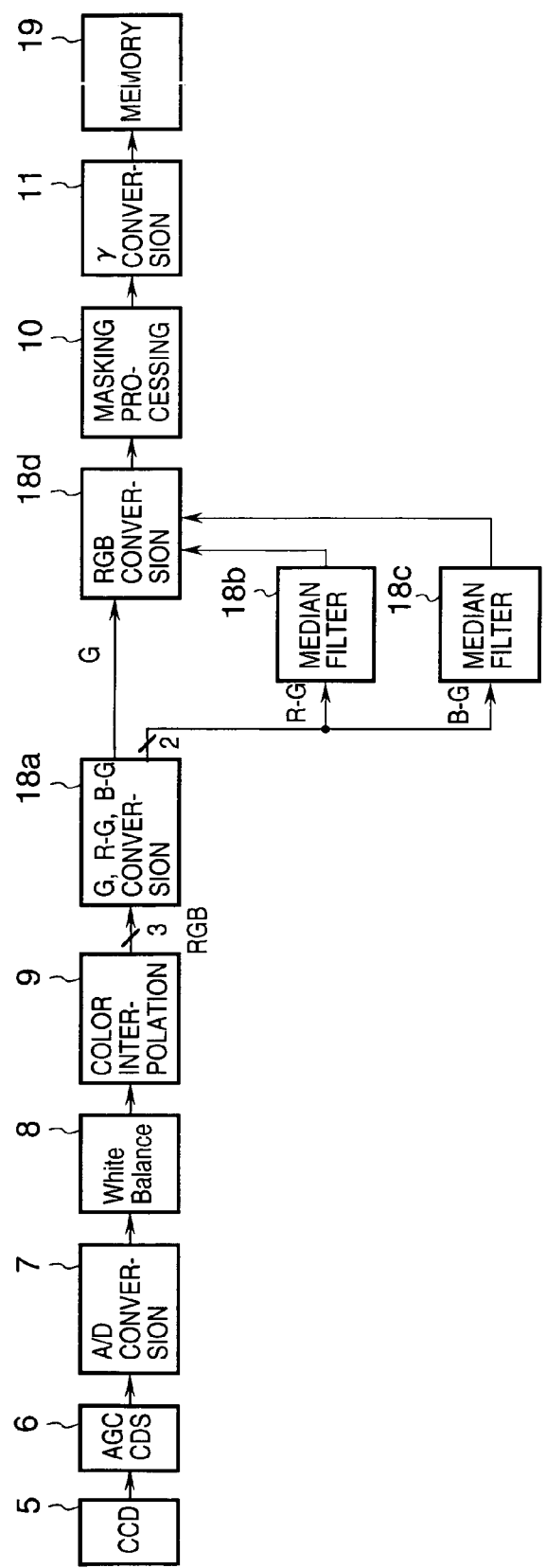
FIG. 4 is a block diagram showing, mainly, a construction of an image processing unit of a digital camera according to the third embodiment of the present invention.

FIG. 4 is a block diagram showing a construction of an image processing unit of a digital camera according to the third embodiment of the present invention. For the components that are common to the construction shown in FIG. 3, the same reference numerals are assigned and description thereof will be omitted.

According to the third embodiment, the amount of calculation is reduced further when compared against the case of converting R, G and B signals to luminance signal Y and color difference signals R-Y and B-Y. The G, R-G, B-G converter 18a generates G, R-G and B-G signals from R, G and B signals using the following equations:

$$Y = G \quad (10)$$

$$R-Y = R-G \quad (11)$$

$$B-Y = B-G \quad (12)$$

The median filters 18b and 18c respectively execute filtering to the R-G and B-G signals, thereby removing pseudo colors generated by color interpolation. Then, the RGB converter 18d converts the G, R-G and B-G signals back to RGB signals, which are then subjected to the masking processor 10 and gamma converter 11, and then stored in the non-volatile memory 19.

As has been described above, since the third embodiment employs G signal in place of luminance signal Y, pseudo color reduction can be realized with a less amount of calculation, although there is a possibility that luminance components of the RGB-signals may be influenced by the result of median filtering.

Fourth Embodiment

The above-described first to third embodiments describe the case of employing an optical low pass filter before the CCD 5. Note that the configuration before the CCD 5 is not shown in FIGS. 3 and 4.

The fourth embodiment describes a case where no problem arises even though the optical system does not comprise such optical low pass filter.

Figure 5:
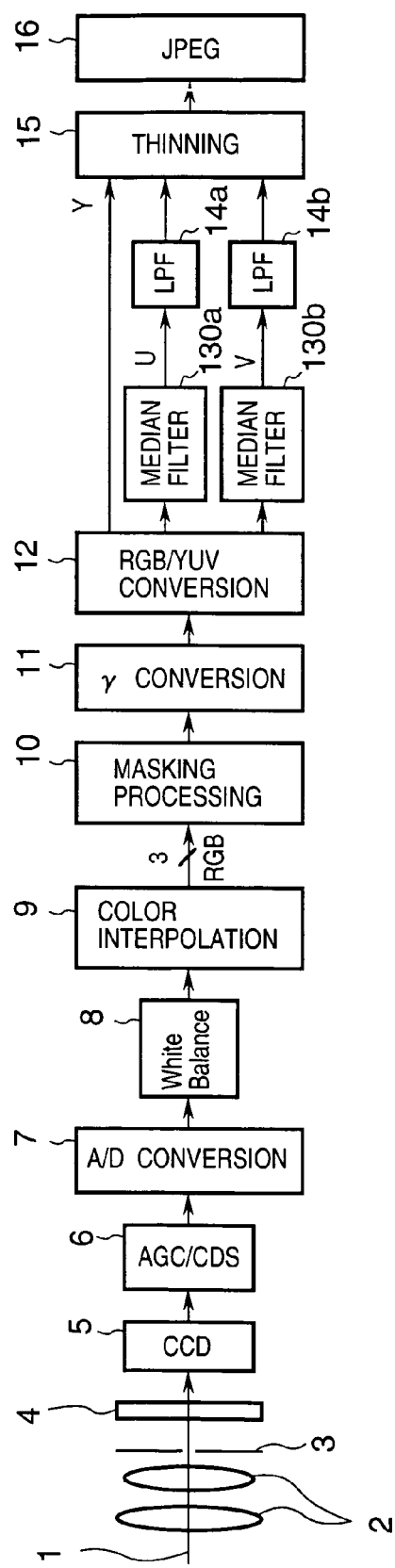
FIG. 5 is a block diagram showing, mainly, a construction of an image processing unit of a digital camera according to the fourth embodiment of the present invention.

FIG. 5 is a block diagram showing a construction of an image processing unit of a digital camera according to the fourth embodiment of the present invention. For the components that are common to the construction shown in FIG. 1, the same reference numerals are assigned and description thereof will be omitted. The fourth embodiment is characterized in that the IR filter 4 for cutting infrared rays is provided before the CCD 5, and that the optical low pass filter 20 employed in FIG. 1 is removed. The configuration after the CCD 5 is the same as that shown in block diagram of FIG. 1.

However, when the optical low pass filter 20 is removed, pseudo colors are generated more than the case of including the optical low pass filter 20. In view of this, the number of elements in median filters 130a and 130b in the fourth embodiment is increased from the number of elements "9" of the median filters according to first to third embodiments. By this, the median filtering can be executed in a wider area, and pseudo colors can be reduced.

Accordingly, since the fourth embodiment is realized by simply mounting the IR filter 4 on the glass surface of the CCD 5, the apparatus main body can be made small and cost reduction can be achieved. In addition, image signals of high resolution can be obtained.

For the isolated point removing filter, filtering called smoothing (Edge Preserving Smoothing), which preserves edges, may be employed besides the above-described median filter. More specifically, a window W(i, j) is set with a pixel f(x, y) as its center, and an output g(x, y) is calculated. Assuming that the window size is m×n, the following equation stands:

$$g(x, y) = \sum_{i=1}^{m} \sum_{j=1}^{n} w(i, j) \times f(x-i, y-i)$$

For instance, assuming a matrix M in which data "1" is arranged in 3×3 matrix, the following equation stands:

$$W = M/9$$

For an alternative isolated point removing filter, another smoothing (Maximum Homogeneity Smoothing) which preserves edges may be employed. This smoothing enables selection of a most uniform area in the neighborhood of a pixel. When the weight coefficient Fi is defined as follows:

weight coefficient $Fi=\{\min(\sigma i)\}/\sigma i$ where an average value of each block is $\mu i$, distribution is $\sigma i$, and m (arbitrary), the output g(x, y) is obtained in the following manner:

$$g(x, y) = \sum_{i=1}^{8} \{(Fi^m)\mu i\} / \sum_{i=1}^{8} Fi^m$$

Besides the above, filtering called hysteresis smoothing may be employed. More specifically, a hysteresis characteristic is produced for a data value, and noise is absorbed by the hysteresis characteristic. Any of the aforementioned filters may be used as long as interpolation or smoothing is performed by using outputs of peripheral pixels of an isolated point having a pixel value largely different from peripheral pixel values.

Fifth Embodiment

Figure 6:
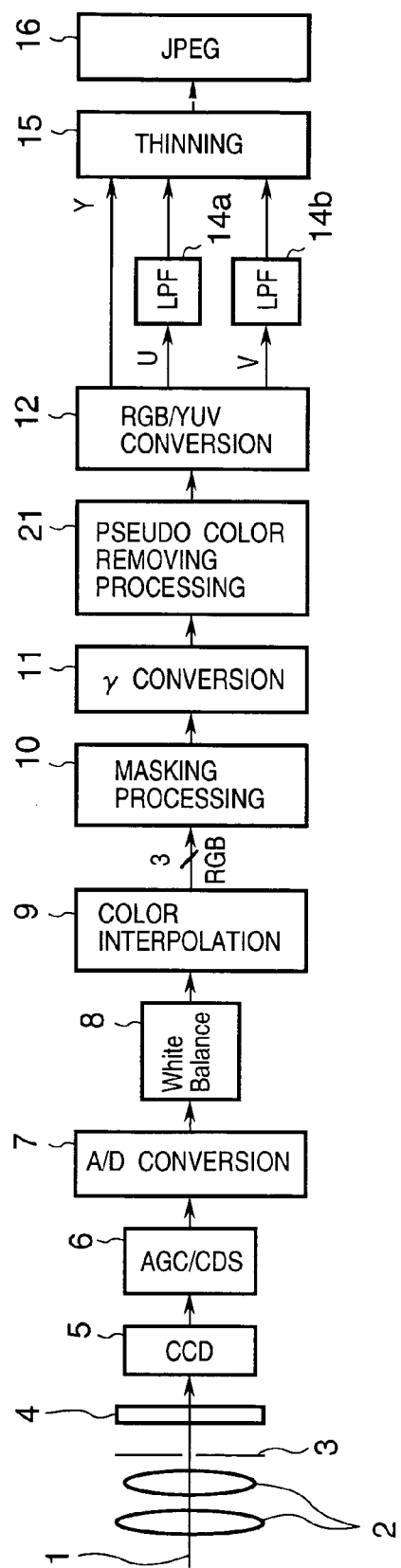
FIG. 6 is a block diagram showing, mainly, a construction of an image processing unit of a digital camera according to the fifth embodiment of the present invention.

FIG. 6 is a block diagram showing, mainly, a construction of an image processing unit of a digital camera according to the fifth embodiment of the present invention. For the components that are common to the foregoing embodiments, the same reference numerals are assigned.

Light 1, incident upon the digital camera according to the fifth embodiment, passes through the lens 2, then the amount of the light is adjusted by the diaphragm 3, and the image sensing device 5 (hereinafter referred to as a CCD), e.g., CCD or CMOS, is exposed while a shutter (not shown) is open. Before the light 1 is incident upon the CCD 5, a frequency region of a long wavelength is cut off by the IR filter 4 so that the CCD 5 does not detect light in the infrared region. By the light incident upon the CCD 5, the amount of electric charge corresponding to the intensity of light is accumulated in the CCD 5. The amount of electric charge is amplified by a predetermined gain by the CDS-AGC 6, and converted to digital data by the A/D converter 7. Image data converted to digital data in the foregoing manner is transferred to the white balance circuit 8 where R, G and B gains are adjusted. Then, by the color interpolator 9, the image data is generated in, for instance, three color (R, G and B) planes. The image data expressed in the R, G and B planes are then transferred to the masking processor 10 where adjustment is made for the hue of the R, G and B colors. Then, the gamma converter 11 performs necessary processing for displaying an image on a display or the like.

Next, a pseudo color removing processor 21 reduces pseudo colors generated by color interpolation of the color interpolator 9. Further, compression processing according to JPEG or the like is performed on the image data since the data in the R, G and B color planes has a large amount of data. Herein, first, the RGB/YUV converter 12 converts the image data from R, G and B signals to Y color difference signal, and with respect to each of the color difference signals U and V, the LPF 14a and 14b respectively perform low pass filtering to limit the band. Then, the thinning circuit 15 performs thinning processing which complies with a predetermined compression method, e.g., from Y:U:V=4:4:4 to Y:U:V=4:2:2 or Y:U:V=4:1:1. Then, a JPEG compression circuit 16 performs compression according to JPEG.

Figure 7:
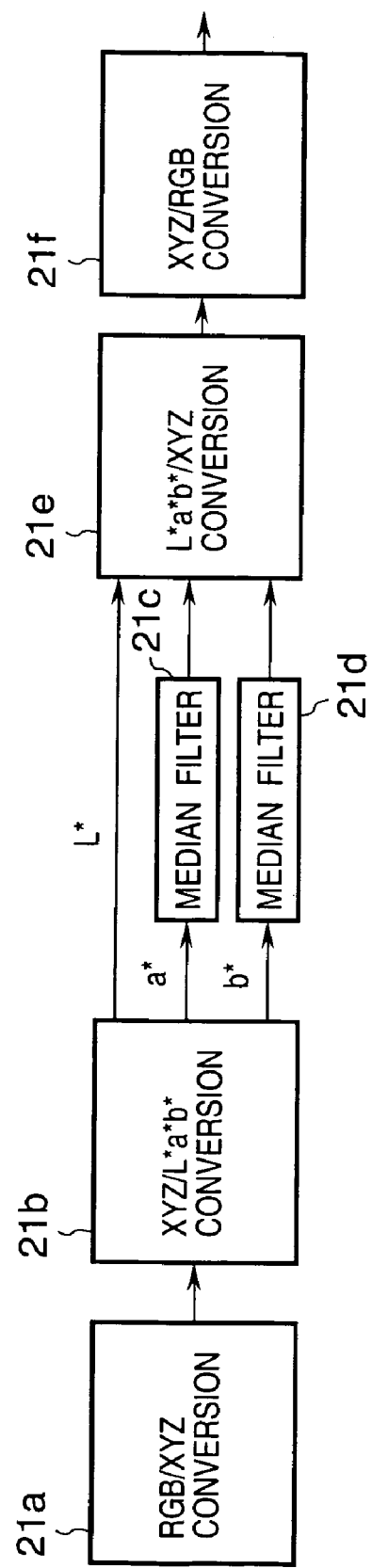
FIG. 7 is a block diagram showing a configuration of a pseudo color removing processor according to the fifth embodiment.

FIG. 7 is a block diagram showing a configuration of the pseudo color removing processor 21 according to the fifth embodiment.

Assume that image data is generated in R, G and B planes by the color interpolator 9. The RGB/XYZ converter 21a converts image data from RGB color space to XYZ color space. The conversion is executed by the following equations (13) to (15):

$$X=2.7689 \times R+1.7517 \times G+1.1302 \times B \quad (13)$$

$$Y=1.0000 \times R+4.5907 \times G+0.0601 \times B \quad (14)$$

$$Z=0.0000 \times R+0.0565 \times G+5.5943 \times B \quad (15)$$

Then, XYZ/L*a*b* converter 21b converts the image data from XYZ color space to L*a*b* color space. The conversion is executed by the following equations (16) to (18):

$$L^*=116(Y/Y_0)^{1/3}-16(Y/Y_0>0.008856) \quad (16)$$

$$a^*=500[(X/X_0)^{1/3}-(Y-Y_0)^{1/3}] \quad (17)$$

$$b^*=200[(Y/Y_0)^{1/3}-(Z-Z_0)^{1/3}] \quad (18)$$

$X_0$, $Y_0$ and $Z_0$ represent tristimulus values of the perfect diffuse surface.

Herein, median filters 21c and 21d, each serving as an isolated point filter, execute median filtering (median value filtering) respectively to a* and b* of the L*a*b*.

Since the principle of the processing performed by the median filters 21c and 21d is the same as the aforementioned description shown in FIGS. 2A and 2B, description thereof will not be provided herein.

Then, L*a*b*/XYZ converter 21e converts image data from L*a*b* color space to XYZ color space. Finally, XYZ/RGB converter 21f converts the image data from XYZ color space to RGB color space. By this, median filtering can be executed only in a color space that gives small influence to the luminance (resolution). Therefore, the decrease in resolution of an image can be prevented.

Sixth Embodiment

Figure 8:
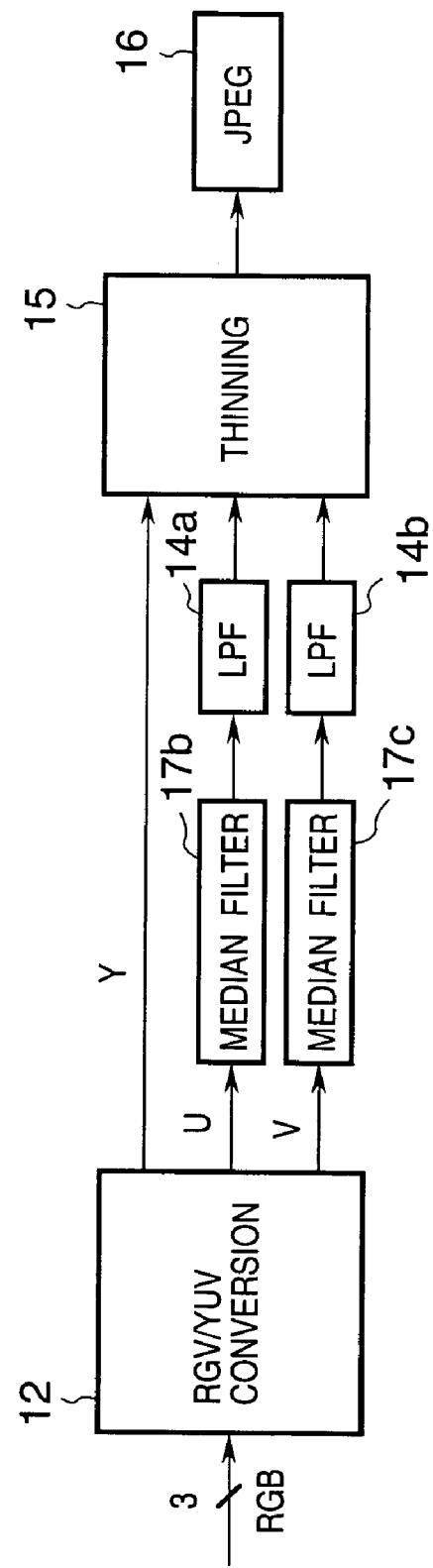
FIG. 8 is a block diagram showing a configuration after the gamma converter shown in FIG. 6, for a digital camera according to the sixth embodiment of the present invention.

FIG. 8 is a block diagram showing a configuration according to the sixth embodiment of the present invention.

In the foregoing fifth embodiment, image data in RGB color space, which has been outputted by the pseudo color removing processor 21, is converted from RGB color space to YUV color space by the RGB/YUV converter 12 to be subjected to JPEG compression. This YUV conversion is executed by the aforementioned equations (1) to (3).

According to the sixth embodiment, instead of the pseudo color removing processor 21, the median filters (median value filters) 17b and 17c execute filtering to U and V signals outputted by the RGB/YUV converter 12. Then, to perform JPEG compression, the LPF 14a and 14b perform low pass filtering to color difference data to limit the band of the color difference signals. Then, the thinning circuit 15 performs thinning into a predetermined format, e.g., from Y:U:V=4: 4:4 to Y:U:V= 4:2:2 or Y:U:V=4:1:1, and compression is performed by the JPEG compression circuit 16.

For the isolated point removing filter, filtering called smoothing (Edge Preserving Smoothing) for preserving edges, which has been described in the fourth embodiment, may be employed besides the above-described median filter.

Furthermore, for the isolated point removing filter, smoothing (Maximum Homogeneity Smoothing) for preserving edges, which has been described in the fourth embodiment, may be employed.

Besides the above, filtering called hysteresis smoothing may be employed. More specifically, a hysteresis characteristic is produced for a data value, and noise is absorbed by the hysteresis characteristic. Any of the aforementioned filters may be used as long as interpolation or smoothing is performed by using outputs of peripheral pixels of an isolated point having a pixel value largely different from peripheral pixel values.

Seventh Embodiment

A characteristic feature of the seventh embodiment is described before explaining a specific example of the seventh embodiment. To eliminate the above-described pseudo colors, it is ideal to employ three-plate camera where CCDs are provided for each of the R, G and B color components. With such structure, the size of a camera increases. In the seventh embodiment, an attention is directed to the fact that pseudo colors generated from red (R) to yellow (Y) and from blue (B) to cyan (C) have high frequencies. Thus, the characteristic feature of the seventh embodiment is to suppress generation of pseudo colors by reducing the gain of a color difference signal when the luminance signal has a high frequency component and the hue falls within a predetermined range.

Figure 9:
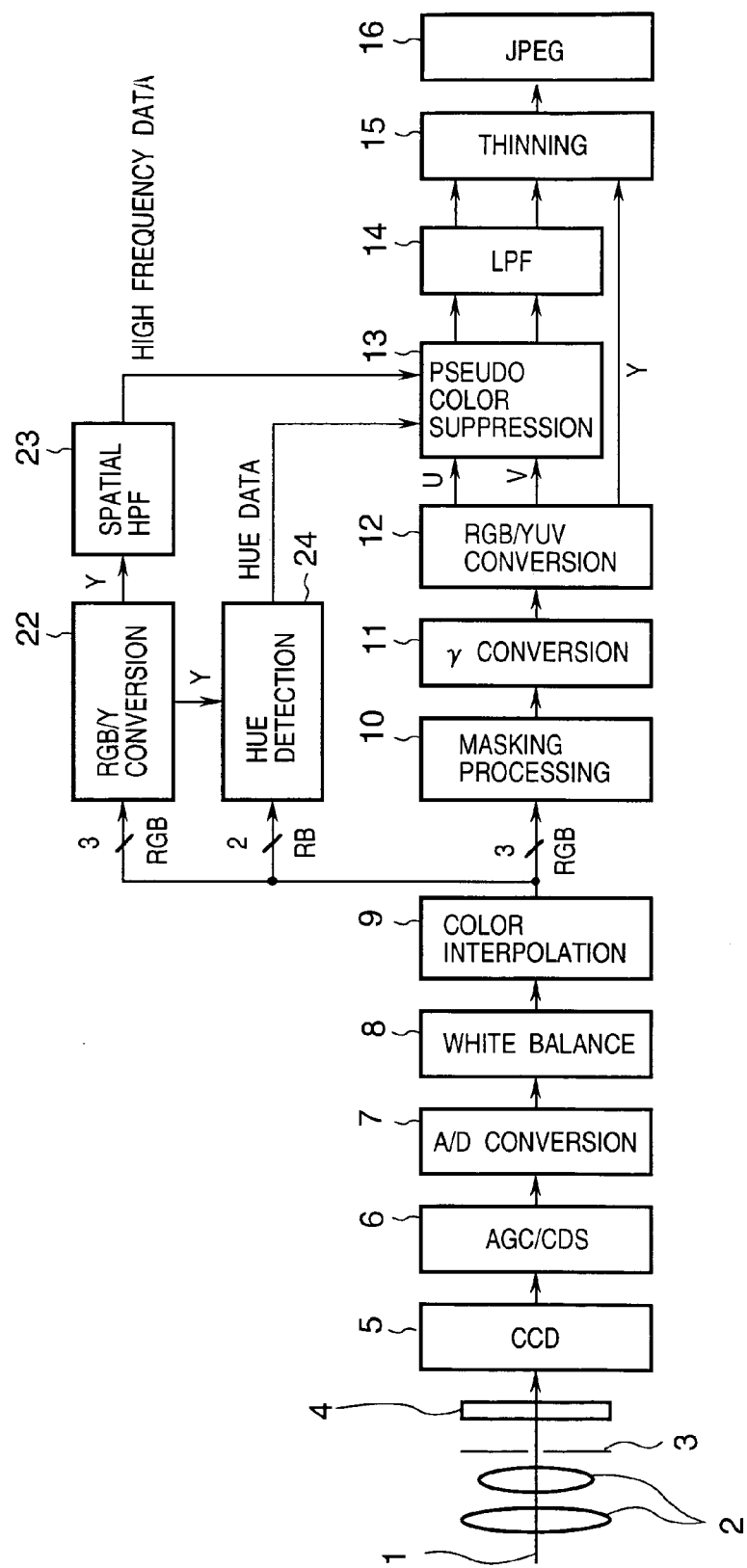
FIG. 9 is a block diagram showing, mainly, a construction of an image processing unit of a digital camera according to the seventh embodiment of the present invention.

FIG. 9 is a block diagram showing, mainly, a construction of an image processing unit of a digital camera according to the seventh embodiment of the present invention.

Figure 10:
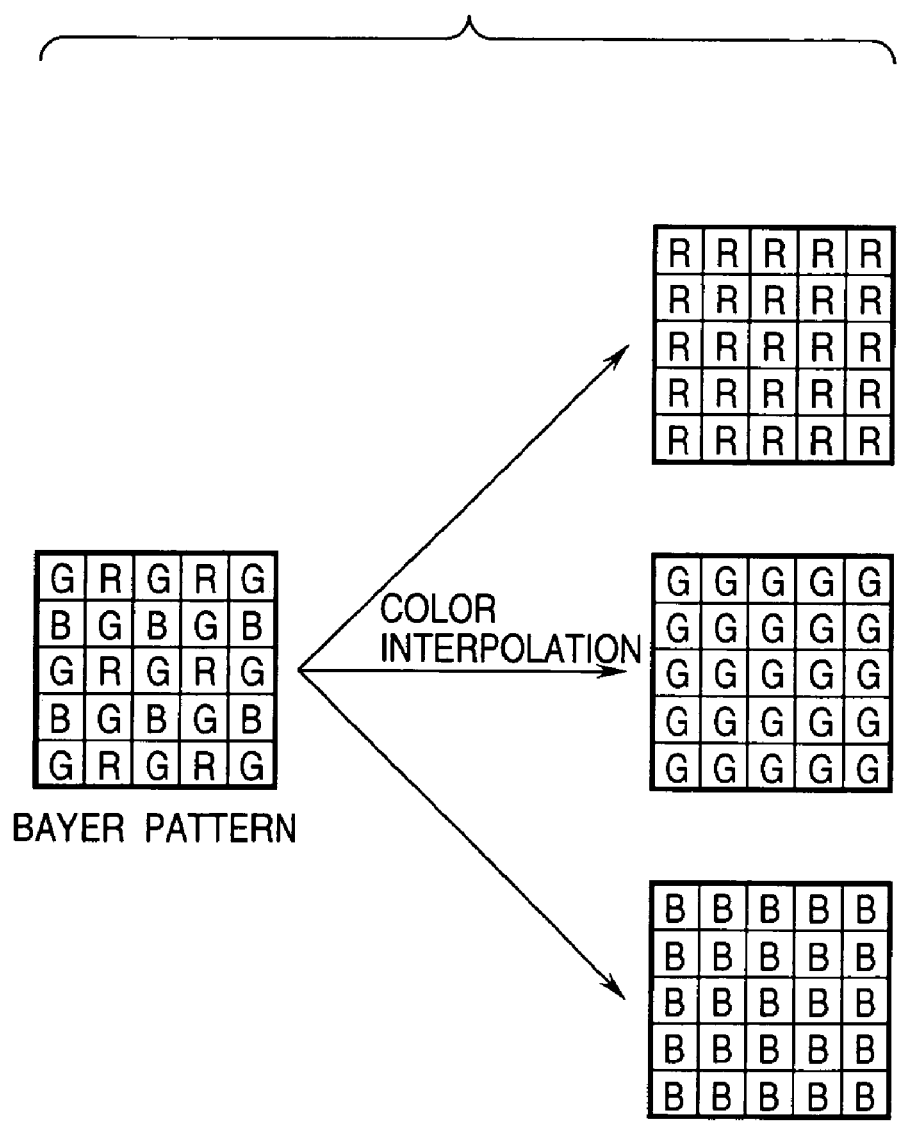
FIG. 10 is a conceptual view for explaining color interpolation according to embodiments of the present invention.

Light 1, incident upon the camera, passes through the lens 2, then the amount of the light is adjusted by the diaphragm 3, and the image sensing device 5 (hereinafter referred to as a CCD), e.g., CCD or CMOS, is exposed while a shutter (not shown) is open. Before the light 1 is incident upon the CCD 5, a frequency area (band) of a long wavelength is cut off by the IR filter 4 so that the CCD 5 does not detect light in the infrared region. The light incident upon the CCD 5 is accumulated in the CCD 5 as an electric charge, and outputted as an electric signal. The electric signal is amplified by a predetermined gain by the CDS·AGC 6, and converted to digital data by the A/D converter 7. Image data converted to digital data in the foregoing manner is transferred to the white balance circuit 8 where R, G and B gains are adjusted. Then, in the color interpolator 9, the image data is generated in, for instance, three color (R, G and B) planes as shown in FIG. 10. The image data expressed in the R, G and B planes are then transferred to the masking processor 10 where adjustment is made for the hue of the R. G and B colors. Then, the gamma converter 11 performs necessary processing for displaying an image on a display or the like. Further, compression processing according to JPEG or the like is performed on the image data since the data in the R, G and B color planes has a large amount of data.

First, RGB/Y converter 22 converts RGB color space to color space of Y color difference signal. The conversion is executed by, for instance, above-mentioned equations (1) to (3).

Figure 11:
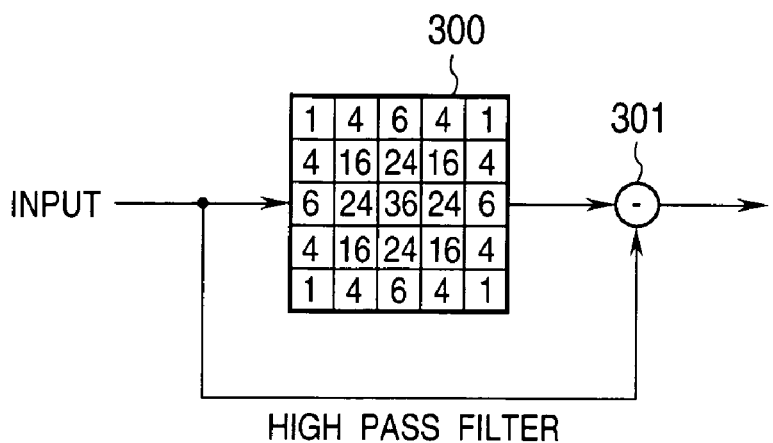
FIG. 11 is an explanatory diagram showing a construction of a high frequency filter according to embodiments of the present invention.

To detect high frequency components and hue, the image data, expressed in the R, G and B planes by the color interpolator 9, is subjected to calculation of a luminance signal Y by the RGB/Y converter 22, using the aforementioned equation (1). Next, to obtain a high frequency component of the obtained luminance signal Y, a spatial high pass filter (HPF) 23 executes spatial high pass filter computation as shown in FIG. 11. The luminance signal Y, obtained by the RGB/Y converter 22, is transferred to a hue detection circuit 24 for detecting a hue, where color difference signals R-Y and B-Y are calculated and a hue is detected based on the calculated results. The detected hue data is outputted to a pseudo color suppression circuit 13. Referring to FIG. 11, spatial high pass filter computation is executed by multiplying an input signal by a matrix 300, and subtracting the input signal from the multiplication result by a subtractor 301.

The pseudo color suppression circuit 13 suppresses pseudo colors by reducing gains of U and V, outputted by the RGB/Y converter 22, based on the high frequency component of the luminance signal Y obtained by the spatial high pass filter 23 and the hue data obtained by the hue detection circuit 24.

The pseudo color suppression processing is described with reference to FIGS. 12 and 13.

First, it is determined whether or not a color of the pixel of interest falls within a predetermined range (area indicated by hatching in FIG. 13) in Y, R-Y, B-Y color space. If the color is determined to be in the range where it is considered as a pseudo color, gains of the color difference signals U and V, having a predetermine value of 1 or larger as shown in FIG. 12, are reduced in accordance with a high frequency component value of the luminance signal outputted by the spatial high pass filter 23. By this, pseudo colors can be suppressed.

Pseudo color suppression processing performed in the above-described configuration is explained. A high frequency component, such as that having a vertical stripe pattern or a checker flag pattern described with reference to FIGS. 19 to 22, is extracted by the spatial HPF 23. The aforementioned pseudo color generation is prevented by reducing gains of color difference signals U and V in the extracted high frequency area, which may cause pseudo colors described in FIGS. 19 to 22 (for instance, predetermined areas of R and Y components in FIG. 19, predetermined areas of C and B components in FIG. 20, or predetermined areas of R and B components in FIGS. 21 and 22, all of which correspond to the hatching portion in FIG. 13).

Next, the low pass filter (LPF) 14 execute low pass filtering in the horizontal or vertical direction. Then, the thinning circuit 15 performs thinning processing of the color difference signals, in accordance with a predetermined JPEG format, e.g., from Y:U:V=4:4:4 to Y:U:V=4:2:2 or Y:U:V=4:1:1. Then, the JPEG compression circuit 16 performs JPEG compression. By this, a compressed image having less pseudo colors can be generated.

Note herein that instead of calculating the luminance signal Y by the aforementioned equation (1), the calculation may be executed with a simplified luminance signal Ye. For instance, aforementioned equation (7), Ye=R+2×G+B, may be used.

Alternatively, a green (G) signal component may be used as a luminance signal without calculating the luminance signal.

Figure 14:
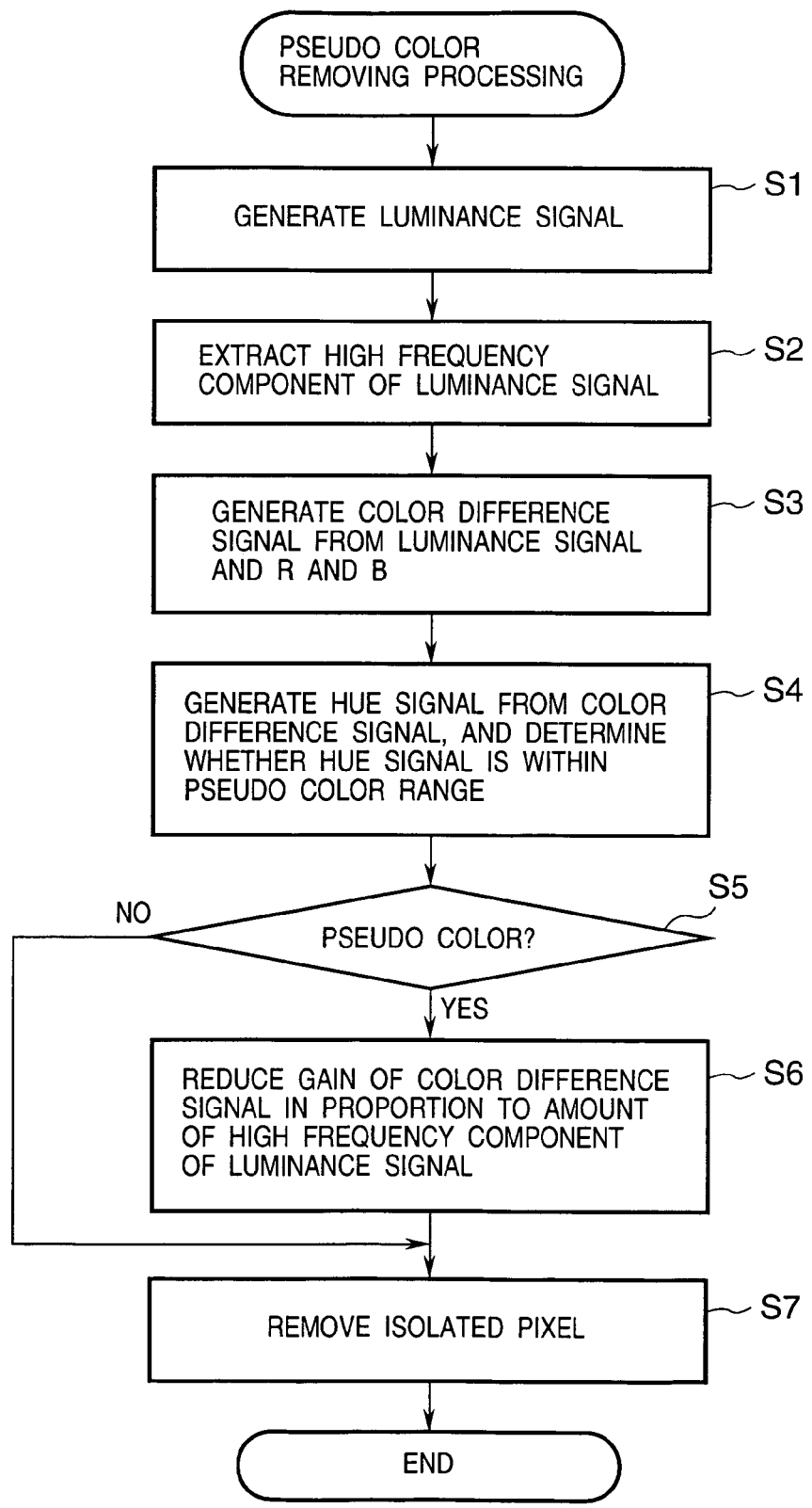
FIG. 14 is a flowchart explaining pseudo color removing processing according to the seventh and eighth embodiments of the present invention.

FIG. 14 is a flowchart explaining pseudo color removing processing according to the seventh embodiment of the present invention.

Referring to FIG. 14, in step S1, R, G and B signals of an image, upon which color interpolation processing has been performed, are inputted and a luminance signal-Y is generated from the R, G and B signals by the RGB/Y converter 22. In step S2, high frequency components of the luminance signal Y are extracted by the spatial high pass filter (HPF) 23. In step S3, differences are respectively calculated between each of R, B signals and the luminance signal Y by the hue detection circuit 24, and color difference signals R-Y and B-Y are generated. In step S4, a hue signal is generated based on the color difference signals, and it is determined whether or not the hue signal falls within a color range that is considered as pseudo colors. If it is determined as a pseudo color in step S5, the control proceeds to step S6 where gains of the color difference signals in the pseudo color portion are reduced in accordance with the amount of high frequency component of the pixel. By this, for instance, in the color space corresponding to the hatching area in FIG. 13, pseudo color components generated by color interpolation can be suppressed. Then the process proceeds to step S7, isolated pixels of the image are removed.

As described above, the seventh embodiment achieves an effect of preventing pseudo colors generation from red to yellow and from blue to cyan.

Eighth Embodiment

A characteristic feature of the eighth embodiment is described before explaining a specific example of the eighth embodiment. To eliminate the above-described pseudo colors, it is ideal to employ three-plate camera where CCDs are provided for each of the R, G and B color components. With such structure, the size of a camera increases. In the eighth embodiment, an attention is directed to the fact that pseudo colors generated from red (R) to yellow (Y) and from blue (B) to cyan (C) have high frequencies. Thus, the characteristic feature of the eighth embodiment is to suppress generation of pseudo colors by removing an isolated point of a luminance signal, having a high frequency component and, if the hue falls within a predetermined range, reducing the gain of the color difference signal.

Figure 15:
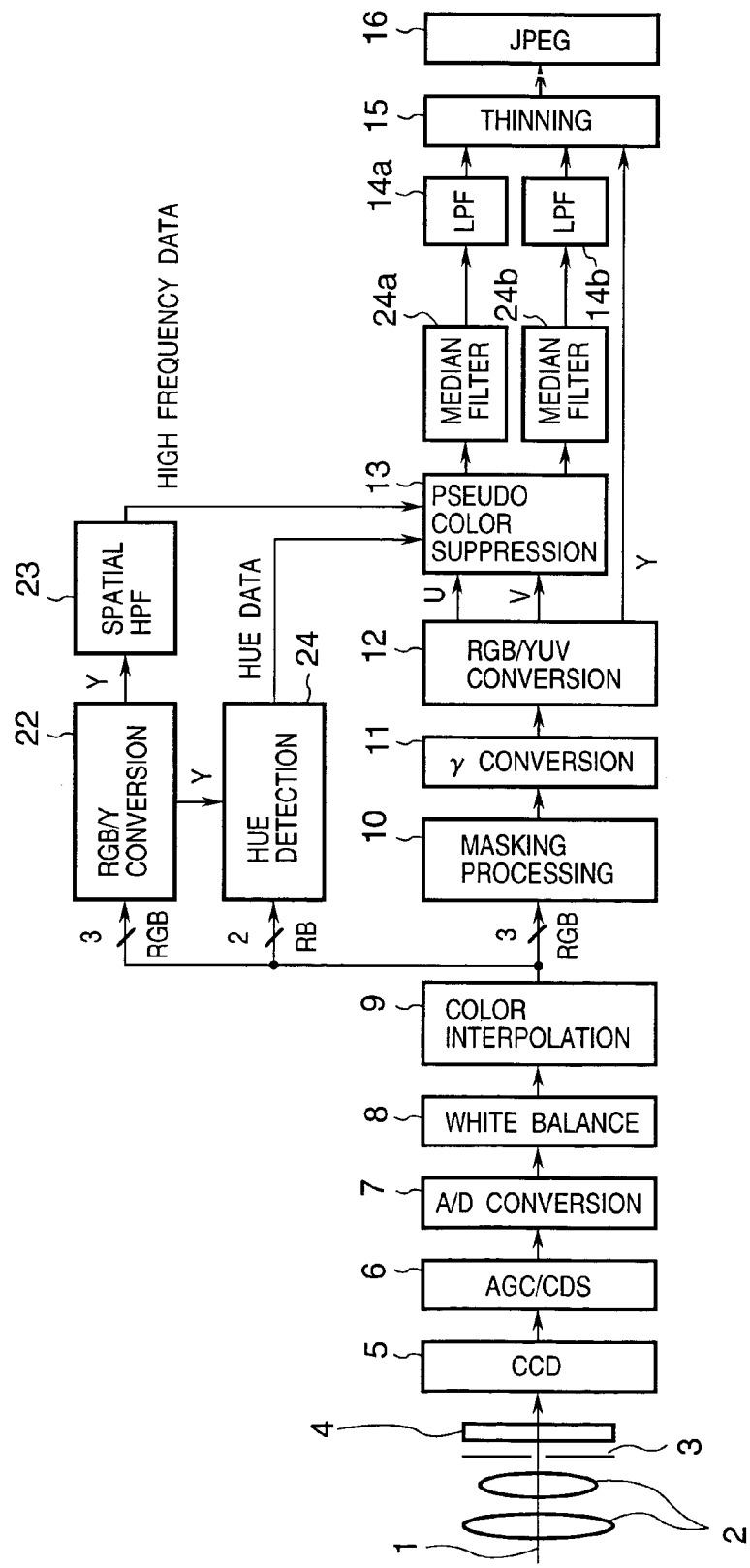
FIG. 15 is a block diagram showing, mainly, a construction of an image processing unit of a digital camera according to the eighth embodiment of the present invention.

FIG. 15 is a block diagram showing, mainly, a construction of an image processing unit of a digital camera according to the eighth embodiment of the present invention.

The pseudo color suppression circuit 13 suppresses pseudo colors by reducing gains of U and V, outputted by the RGB/YUV converter 22, based on a high frequency component of the luminance signal Y obtained by the spatial high pass filter 23 and hue data obtained by the hue detection circuit 24. The pseudo color suppression processing is performed in the same manner as that of the above-described seventh embodiment.

Among the above-described pseudo colors, patterns of pseudo colors from red (R) to yellow (Y) and from blue (B) to cyan (C) can be determined as pseudo colors by detecting high frequency components of the luminance signal because the degree of luminance of pseudo colors are different from others. However, pseudo colors generated around a character are often isolated, and the degree of luminance of ht pseudo colors are not always different from the peripheral pixel luminance.

In view of the above, according to the eighth embodiment, the median filters 24a and 24b remove isolated points with respect to the color difference signals U and V and further perform pseudo color removal. FIGS. 2A and 2B explain this processing. Herein, elements having 3×3 pixel area including a pixel of interest are arranged in the ascending order, and the value of the pixel of interest is replaced with a median value of the arranged pixels. By this, a pixel, having a color of extremely different hue from the hues of peripheral pixels, can be eliminated. Particularly, since the low pass filtering is not executed in the eighth embodiment, resolution does not decrease largely, thus does not influence peripheral pixels.

Pseudo color suppression processing performed in the above-described configuration is explained. A high frequency component, such as that having a vertical stripe pattern or a checker flag pattern described with reference to FIGS. 19 to 22, is extracted by the spatial HPF 23. The aforementioned pseudo color generation is prevented by reducing gains of color difference signals U and V in the extracted high frequency area, which may cause the pseudo colors described in FIGS. 19 to 22 (for instance, predetermined areas of R and Y components in FIG. 19, predetermined areas of C and B components in FIG. 20, or predetermined areas of R and B components in FIGS. 21 and 22, all of which correspond to the hatching portion in FIG. 13). After pseudo colors are suppressed in the foregoing manner, the median filters 24a and 24b execute above-described filtering, thereby removing isolated pixels.

Next, the low pass filter (LPF) 14a and 14b execute low pass filtering in the horizontal or vertical direction. Then, the thinning circuit 15 performs thinning processing of the color difference signals, in accordance with a predetermined JPEG format, e.g., from Y:U:V=4:4:4 to Y:U:V=4:2:2 or Y:U:V= 4:1:1. Then, the JPEG compression circuit 16 performs JPEG compression. By this, a compressed image having less pseudo colors can be generated.

Note that, to calculate the luminance signal Y, the aforementioned equation (7) may be used.

Alternatively, a green (G) signal component may be used as a luminance signal without calculating the luminance signal.

Since the pseudo color removal processing according to the eighth embodiment is performed in the same manner as that explained in the flowchart in FIG. 14, detailed description will be omitted herein.

Ninth Embodiment

In the foregoing seventh and eighth embodiments, means for detecting pseudo colors is provided after the color interpolator 9 and pseudo color detection is performed using signals in the R, G and B planes. The reason is that, since processing such as masking processing, y conversion and so forth that may cause changes in hue are performed after the color interpolator 9, the hue range of the detected pseudo colors may change. Because of this reason, the luminance signal Y is calculated to obtain color difference signals R-Y and B-Y. However, the pseudo color detection means does not have to be provided in this position. For instance, in order to perform JPEG compression, RGB color space must be converted to a color space of luminance or color difference. Therefore, pseudo colors can be detected from these signals. The ninth embodiment relates to such case. Note that, as mentioned above, there is a possibility that the hue range of pseudo colors changes depending on images.

Figure 16:
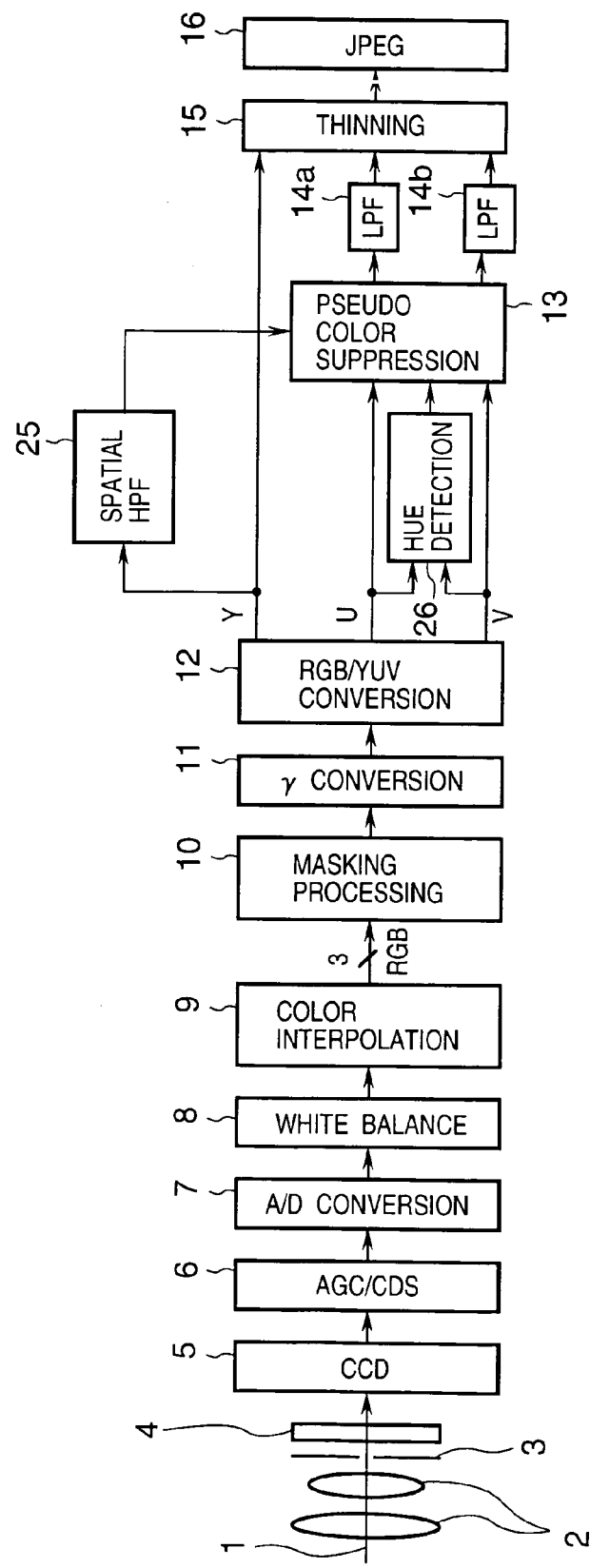
FIG. 16 is a block diagram showing a construction of an image processing unit of a digital camera according to the ninth embodiment of the present invention.

FIG. 16 is a block diagram showing a construction of an image processing unit of a digital camera according to the ninth embodiment of the present invention. For the components that are common to the construction shown in FIG. 9, the same reference numerals are assigned.

Light 1, incident upon the camera, passes through the lens 2, then the amount of the light is adjusted by the diaphragm 3, and the CCD 5 is exposed while a shutter (not shown) is open. Before the light 1 is incident upon the CCD 5, a frequency area of a long wavelength is cut off by the IR filter 4 so that the CCD 5 does not detect light in the infrared region. The light incident upon the CCD 5 is accumulated in the CCD 5 as an electric charge, and outputted as an electric signal. The electric signal is amplified by a predetermined gain by the CDS-AGC 6, and converted to digital data by the A/D converter 7. Image data converted to digital data in the foregoing manner is transferred to the white balance circuit 8 where R, G and B gains are adjusted. Then, in the color interpolator 9, the image data is generated in, for instance, three color (R, G and B) planes as shown in FIG. 2. The image data expressed in the R, G and B planes are then transferred to the masking processor 10 where adjustment is made for the hue of the R, G and B colors. Then, the gamma converter 11 performs necessary processing for displaying an image on a display or the like. Then, RGB/YUV converter 12 converts the image data from RGB color space to color space of Y color difference signal.

Figure 17:
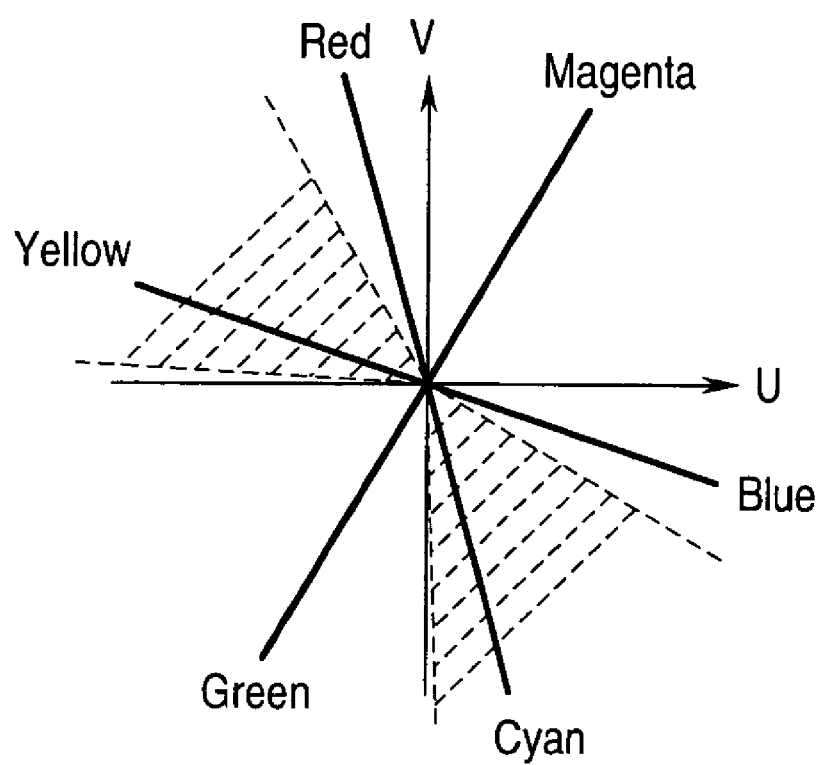
FIG. 17 shows a hue range of pseudo colors in pseudo color suppression processing according to the ninth embodiment of the present invention.

Among the converted signals, luminance signal Y is transmitted to the spatial high pass filter (HPF) 25 for detecting high frequency components of the signal by the filtering shown in FIG. 11. Then, a hue detection circuit 26 determines whether or not a pixel of interest falls within the hue range of pseudo colors. Herein, instead of the above-described color space R-Y and B-Y shown in FIG. 13, U and V outputted by the RGB/YUV converter 12 are used as shown in FIG. 17.

Figure 12:
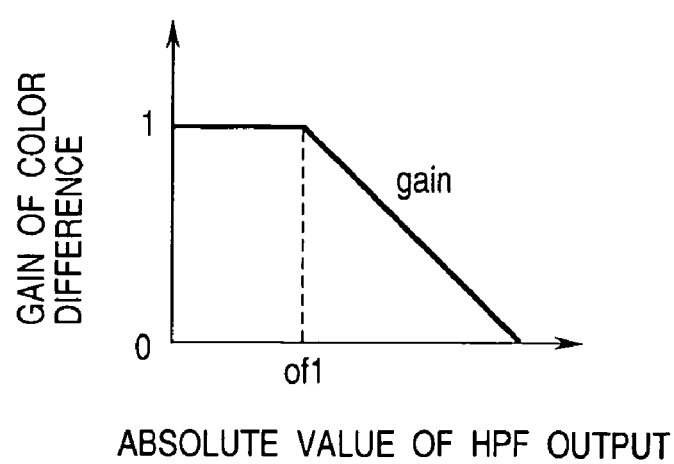
FIG. 12 is a graph explaining processing of a pseudo color suppression unit according to embodiments of the present invention.
Figure 13:
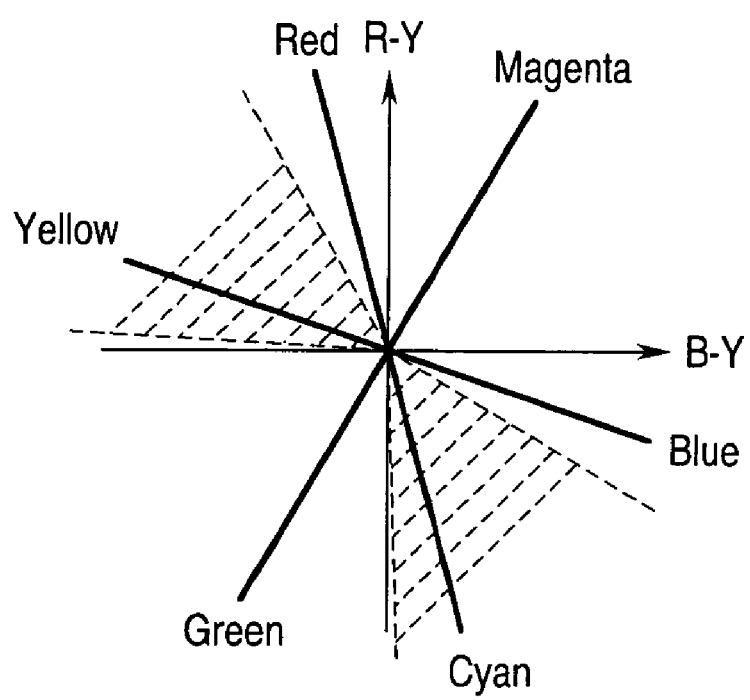
FIG. 13 shows a hue range of pseudo colors in pseudo color suppression processing according to embodiments of the present invention.

As similar to the seventh and eighth embodiments, if it is determined that a color of the pixel of interest falls within the hue range of pseudo colors, the pseudo color suppression circuit 13 reduces gains of the color difference signals U and V, having a value of 1 or larger as shown in FIG. 12, in accordance with an output value of the spatial HPF 25.

In this case, for instance, it may be necessary to change, for instance, the hue range depending on the white balance. For instance, when the gain of red is increased, the hue range is shifted towards red, or a hue angle is widened.

Next, the LPF 14a and 14b execute low pass filtering in the horizontal or vertical direction. Then, the thinning circuit 15 performs thinning processing of the color difference signals, in accordance with a predetermined JPEG format, e.g., from Y:U:V=4:4:4 to Y:U:V=4:2:2 or Y:U:V=4:1:1. Then, the JPEG compression circuit 16 performs JPEG compression.

By this, a compressed image having less pseudo colors can be generated.

Tenth Embodiment

In the foregoing seventh and eighth embodiments, means for detecting pseudo colors is provided after the color interpolator 9 and pseudo color detection is performed using signals in the R, G and B planes. The reason is that, since processing such as masking processing, γ conversion and so forth that may cause changes in hue are performed after the color interpolator 9, the hue range of the detected pseudo colors may change. Because of this reason, the luminance signal Y is calculated to obtain color difference signals R-Y and B-Y. However, the pseudo color detection means does not have to be provided in this position. For instance, in order to perform JPEG compression, RGB color space must be converted to a color space of luminance and color difference. Therefore, pseudo colors can be detected from these signals. With reference to the foregoing eighth embodiment (FIG. 15), in the median filters 24a and 24b where pseudo color suppression is performed, delay is generated between the luminance signal Y and color difference signals U and V. Because of this, the luminance signal must also be delayed. The tenth embodiment makes use of this delay.

Figure 18:
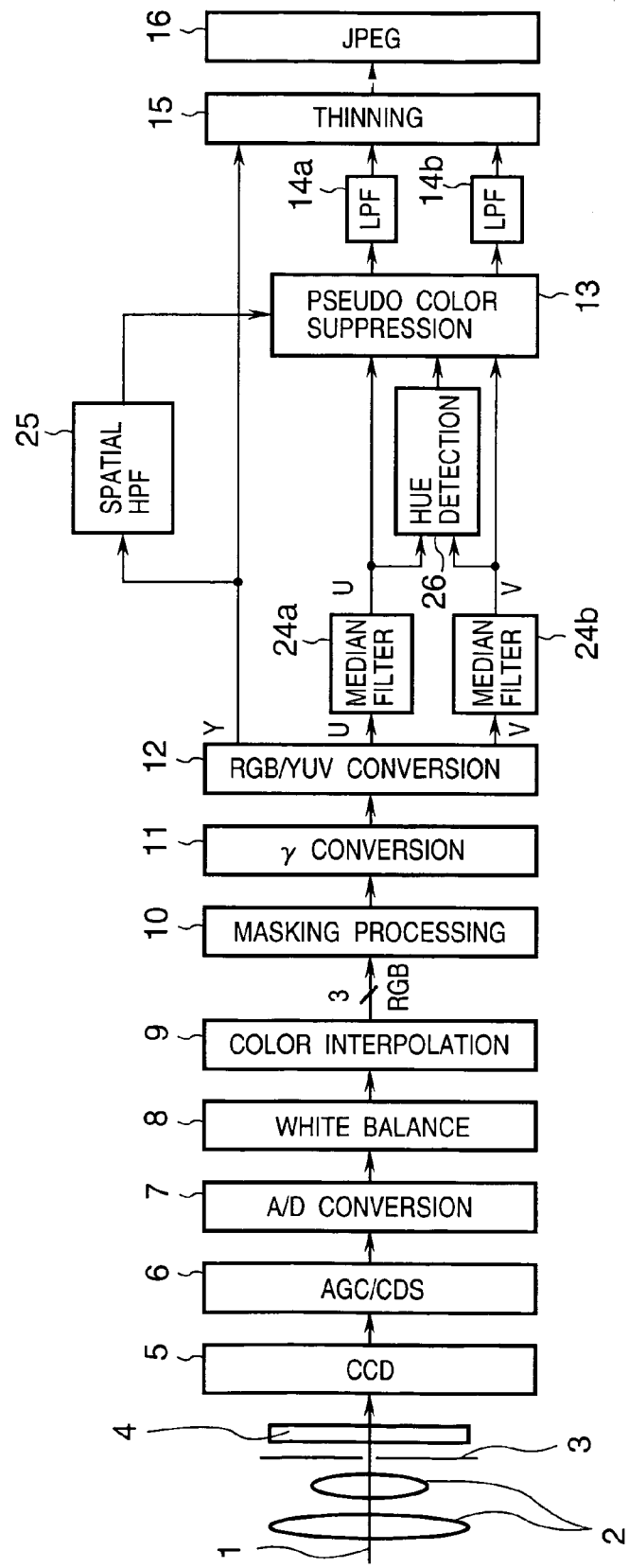
FIG. 18 is a block diagram showing a construction of an image processing unit of a digital camera according to the tenth embodiment of the present invention.
Figure 19:
FIG. 19 is a conceptual view explaining a general pseudo color generation process.
Figure 21:
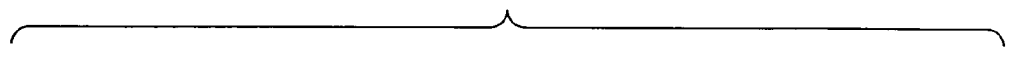
FIG. 21 is a conceptual view explaining a general pseudo color generation process.
Figure 22:
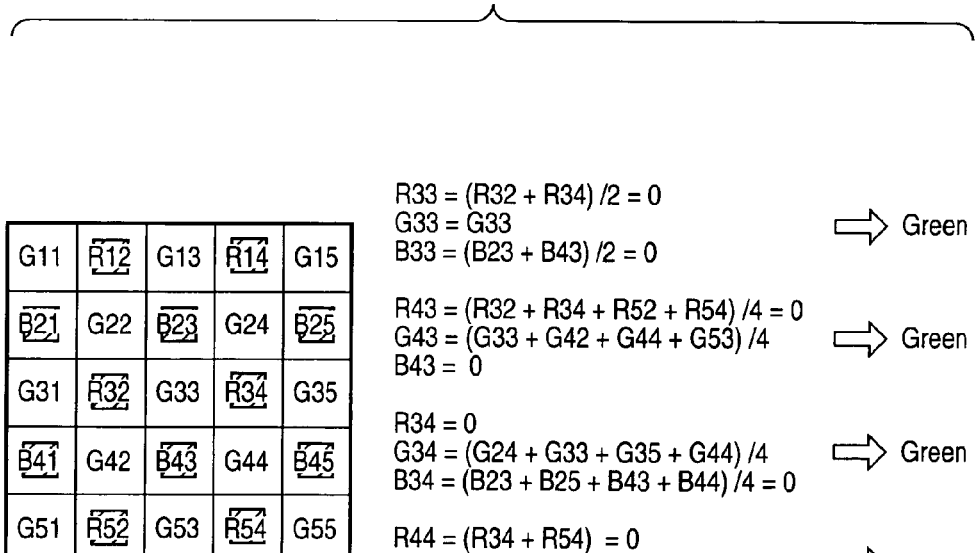
FIG. 22 is a conceptual view explaining a general pseudo color generation process.

FIG. 18 is a block diagram showing a construction of an image processing unit of a digital camera according to the tenth embodiment of the present invention. For the components that are common to the construction shown in FIG. 15, the same reference numerals are assigned.

Light 1, incident upon the camera, passes through the lens 2, then the amount of the light is adjusted by the diaphragm 3, and the CCD 5 is exposed while a shutter (not shown) is open. Before the light 1 is incident upon the CCD 5, a frequency area of a long wavelength is cut off by the IR filter 4 so that the CCD 5 does not detect light in the infrared region. The light incident upon the CCD 5 is accumulated in the CCD 5 as an electric charge, and outputted as an electric signal. The electric signal is amplified by a predetermined gain by the CDS•AGC 6, and converted to digital data by the A/D converter 7. Image data converted to digital data in the foregoing manner is transferred to the white balance circuit 8 where R, G and B gains are adjusted. Then, in the color interpolator 9, the image data is generated in, for instance, three color (R, G and B) planes as shown in FIG. 2. The image data expressed in the R, G and B planes are then transferred to the masking processor 10 where adjustment is made for the hue of the R, G and B colors. Then, the gamma converter 11 performs necessary processing for displaying an image on a display or the like. Then, RGB/YUV converter 12 converts the image data from RGB color space to color space of Y color difference signal.

Among the converted signals, luminance signal Y is transmitted to the spatial high pass filter (HPF) 25 for detecting high frequency components of the luminance signal by the filtering shown in FIG. 11. Meanwhile, color difference signals U and V are transmitted to the median filters 24a and 24b for executing the above-described median filtering shown in FIGS. 2A and 2B. By virtue of this, while high frequency components of the luminance signal Y are detected, median filtering is executed to the color difference signals. Therefore, it is possible to reduce wasteful use of a memory caused by delay of one of the signals.

Next, the hue detection circuit 26 determines whether or not a pixel of interest falls within the hue range of pseudo colors. Herein, instead of the above-described color space R-Y and B-Y shown in FIG. 13, U and V outputted by the RGB/YUV converter 12 are used as shown in FIG. 17.

As similar to the eighth embodiment, if it is determined that a color of the pixel of interest falls within the hue range of pseudo colors, the pseudo color suppression circuit 13 reduces gains of the color difference signals U and V, having a value of 1 or larger as shown in FIG. 12, in accordance with an output value of the spatial HPF 25.

In this case, for instance, it may be necessary to change, for instance, the hue range depending on the white balance. For instance, when the gain of red is increased, the hue range is shifted to the red, or a hue angle is widened.

Next, the LPF 14a and 14b execute low pass filtering in the horizontal or vertical direction. Then, the thinning circuit 15 performs thinning processing of the color difference signals, in accordance with a predetermined JPEG format, e.g., from Y:U:V=4:4:4 to Y:U:V=4:2:2 or Y:U:V=4:1:1. Then, the JPEG compression circuit 16 performs JPEG compression.

By this, a compressed image having less pseudo colors can be generated.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a computer (CPU or MPU) of the system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

As has been set forth above, according to the above-described embodiments, RGB color space is converted to YUV or Y, R-Y, B-Y or G, R-G, B-G color space, and isolated point removing filtering (e.g., median filter or the like) is executed respectively to color difference signals in UV, or R-Y, B-Y or R-G, B-G color space, thereby enabling reduction of pseudo colors generated by color interpolation.

Furthermore, according to the above-describe embodiments, even if an optical low pass filter is not provided before the image sensing device, such as CCD or the like, pseudo color components can be reduced by converting RGB color space to L*a*b* or YUV color space, then performing filtering to color difference signals such as a* and b* signals or U and V signals with the isolated point removing filter, and then performing compression according to JPEG or the like. Accordingly, an image, having less block distortion and reduced pseudo color components, can be obtained.

Furthermore, according to the above-described embodiments, pseudo colors generated by color interpolation can be suppressed by detecting high frequency components of a luminance signal and pseudo colors generated from red to yellow and from blue to cyan in the hue, and then reducing gains of color difference signals U and V.

Still further, according to the above-described embodiments, pseudo colors generated by color interpolation can be suppressed by detecting high frequency components of a luminance signal and pseudo colors generated from red to yellow and from blue to cyan in the hue, then reducing gains of color difference signals U and V, and further eliminating isolated pixels.

Still further, according to the above-described embodiments, pseudo colors generated by color interpolation can be suppressed by executing median filtering to color difference signals in the color space of luminance and color difference signals, then detecting high frequency components of a luminance signal and pseudo colors generated from red to yellow and from blue to cyan in color difference signals, and reducing gains of color difference signals U and V.

Still further, according to the above-described embodiments, by executing median filtering to color difference signals while detecting high frequency components of a luminance signal, it is possible to eliminate a processing circuit necessary to match delayed timing of the luminance signal and color difference signals.

The present invention is not limited to the above embodiments and various changes and modifications can be made within the spirit and scope of the present invention. Therefore, to apprise the public of the scope of the present invention, the following claims are made.

What is claimed is:

1. An image sensing apparatus comprising:
   an image sensing device;
   an A/D conversion unit configured to convert an analogue image signal outputted by said image sensing device into a digital signal;
   a color interpolation unit configured to perform color interpolation on the digital signal converted by said A/D conversion unit and generate image data on a plurality of color planes;
   a gamma conversion unit configured to perform a gamma conversion on the image data generated by said color interpolation unit;
   a color space conversion unit configured to convert a color space of the plurality of color planes of the image data converted by said gamma conversion unit, to a color space of another colorimetric system;
   a pseudo color removing unit configured to reduce a color component generated by said color interpolation unit, by controlling a color difference signal converted by said color space conversion unit, so that pseudo color components of the image data are reduced;
   a thinning unit configured to thin the image data in which the pseudo color components are reduced by said pseudo color removing unit, wherein the thinning process complies with a predetermined compression method; and
   a compression unit configured to compress the image data in which the ratio of the color components are changed by said thinning unit and the pseudo color components are reduced by said pseudo color removing unit, wherein said compression unit compresses the image data according to the predetermined compression method,
   wherein said color space conversion unit is arranged between said gamma conversion unit and said pseudo color removing unit, and said thinning unit is arranged between said pseudo color removing unit and said compression unit.

2. The image sensing apparatus according to claim 1, wherein said pseudo color removing unit includes an isolated point removing filter which replaces a value of a pixel of interest with a substantial median pixel value of peripheral pixels of the pixel of interest.

3. The image sensing apparatus according to claim 2, wherein said isolated point removing filter includes a median value filter or median filter.

4. The image sensing apparatus according to claim 1, wherein said color interpolation unit generates image data in R, G and B planes.

5. The image sensing apparatus according to claim 1, wherein said color space conversion unit converts RGB color space to YUV color space.

6. The image sensing apparatus according to claim 1, wherein said color space conversion unit converts RGB color space to Y, R-Y, B-Y color space.

7. The image sensing apparatus according to claim 1, wherein said color space conversion unit converts RGB color space to G, R-G, B-G color space.

8. The image sensing apparatus according to claim 1, further comprising a focusing unit for focusing into an image on said image sensing device, wherein said focusing unit includes an infrared ray filter, or an infrared ray filter and optical low pass filter.

9. An image processing method for an image sensing apparatus which includes an image sensing device and generates an image signal corresponding to an image formed on the image sensing device, comprising:

an A/D conversion step of converting an analogue image signal outputted by the image sensing device into a digital signal;

a color interpolation step of performing color interpolation on the digital signal converted in said A/D conversion step and generating image data on a plurality of color planes;

a gamma conversion step of performing a gamma conversion on the image data generated in said color interpolation step;

a color space conversion step of converting a color space of the plurality of color planes of the image data converted in said gamma conversion step, to a color space of another calorimetric system;

a pseudo color removing step of reducing a color component generated in said color interpolation step, by controlling a color difference signal converted in said color space conversion step, so that pseudo color components of the image data are reduced;

a thinning step of thinning the image data in which the pseudo color components are reduced in said pseudo color removing step, wherein the thinning process complies with a predetermined compression method; and a compression step of compressing the image data in which the ratio of the color components are changed in said thinning step and the pseudo color components are reduced in said pseudo color removing step, wherein said compression step compresses the image data according to the predetermined compression method, wherein said color space conversion step is implemented between said gamma conversion step and said pseudo color removing step, and said thinning step is implemented between said pseudo color removing step and said compression step.

10. The image processing method according to claim 9, wherein in said pseudo color removing step, a value of a pixel of interest is replaced with a substantial median pixel value of peripheral pixels of the pixel of interest.

11. The image processing method according to claim 9, wherein in said pseudo color removing step, filtering is performed by a median value filter or median filter.

12. The image processing method according to claim 9, wherein in said color interpolation step, image data is generated in R, G and B planes.

13. The image processing method according to claim 9, wherein in said color space conversion step, RGB color space is converted to YUV color space.

14. The image processing method according to claim 9, wherein in said color space conversion step, RGB color space is converted to Y, R-Y, B-Y color space.

15. The image processing method according to claim 9, wherein in said color space conversion step, RGB color space is converted to G, R-G, B-G color space.

* * * * *